US011151641B2

(12) United States Patent
Benkar et al.

(10) Patent No.: US 11,151,641 B2
(45) Date of Patent: Oct. 19, 2021

(54) VIRTUAL DISPLAY DEVICE FOR AN INTERACTIVE MERCHANT SALES ENVIRONMENT

(71) Applicant: PAYPAL, INC., San Jose, CA (US)

(72) Inventors: Rohan Benkar, San Jose, CA (US); Jaya Kumar Murari, San Jose, CA (US); Leo Hsieh, Mountain View, CA (US); Yu Jiang, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 176 days.

(21) Appl. No.: 16/197,312

(22) Filed: Nov. 20, 2018

(65) Prior Publication Data

US 2019/0279283 A1 Sep. 12, 2019

Related U.S. Application Data

(63) Continuation of application No. 14/513,178, filed on Oct. 13, 2014, now Pat. No. 10,134,082.

(51) Int. Cl.
*G06Q 30/00* (2012.01)
*G06Q 30/06* (2012.01)
*G06F 3/14* (2006.01)
*H04N 9/31* (2006.01)

(52) U.S. Cl.
CPC .......... *G06Q 30/0643* (2013.01); *G06F 3/14* (2013.01); *H04N 9/3185* (2013.01)

(58) Field of Classification Search
None
See application file for complete search history.

(56) References Cited

U.S. PATENT DOCUMENTS

| 6,381,583 | B1 | 4/2002 | Kenney | |
| 8,427,481 | B1 * | 4/2013 | Schileru | G06F 3/04815 345/440 |
| 8,965,460 | B1 | 2/2015 | Rao et al. | |
| 9,645,394 | B2 * | 5/2017 | Kinnebrew | G06T 19/006 |
| 9,734,634 | B1 * | 8/2017 | Mott | G06F 3/0304 |
| 9,824,391 | B2 * | 11/2017 | Glazer | G06Q 30/0613 |

(Continued)

OTHER PUBLICATIONS

Zheng Qin, "Introduction to E-commerce", 2009, Springer, springer.com (Year: 2009).*
John David N. Dionisio etal; "3D Virtual Worlds and the Metaverse: Current Status and Future Possibilities"; Jun. 1, 2013; Digital Commons@Loyola Marymount University and Loyola Law School (Year: 2013).*

(Continued)

*Primary Examiner* — Naeem U Haq
*Assistant Examiner* — Norman Donald Sutch, Jr.
(74) *Attorney, Agent, or Firm* — Haynes and Boone, LLP

(57) ABSTRACT

There is provided systems and method for a virtual display device for an interactive merchant sales environment. A device, such as a communication device, may allow a user to view virtual images of items in a user environment so that a user may view what their potential purchase may look like when placed into the user environment. The user environment may include a residential room, an office, a car interior, or other location where a user may place purchased items. The user may submit a request to view an item in the user environment to the device, which may communicate the request to a merchant or a service provider. The virtual image may correspond to digital image(s) of an item used to present a three dimensional virtual image of the item in the user environment. The device may receive the virtual image(s) and display them to the user.

20 Claims, 5 Drawing Sheets

(56) References Cited

U.S. PATENT DOCUMENTS

| | | | |
|---|---|---|---|
| 10,587,864 B2 * | 3/2020 | Hayasaka | H04N 13/279 |
| 2001/0034661 A1 | 10/2001 | Ferreira | |
| 2004/0193441 A1 * | 9/2004 | Altieri | A63F 13/216 |
| | | | 709/203 |
| 2010/0070378 A1 | 3/2010 | Trotman et al. | |
| 2010/0185514 A1 | 7/2010 | Glazer et al. | |
| 2010/0205043 A1 | 8/2010 | Edwards | |
| 2011/0148924 A1 | 6/2011 | Tapley et al. | |
| 2011/0251905 A1 | 10/2011 | Lawrence et al. | |
| 2012/0090005 A1 | 4/2012 | Marlow et al. | |
| 2012/0124471 A1 * | 5/2012 | Gusky | G06T 19/003 |
| | | | 715/705 |
| 2012/0249741 A1 * | 10/2012 | Maciocci | G06T 15/503 |
| | | | 348/46 |
| 2013/0215116 A1 | 8/2013 | Siddique et al. | |
| 2014/0104274 A1 | 4/2014 | Hilliges et al. | |
| 2015/0309705 A1 * | 10/2015 | Keeler | G06F 3/011 |
| | | | 705/27.2 |
| 2015/0379621 A1 * | 12/2015 | Xia | G06F 3/0481 |
| | | | 705/27.2 |

OTHER PUBLICATIONS

Dhirendra Kumar Verma et al; "Virtual Walkthrough of Data Centre"; 2013; Raja Ramanna Centre for Advanced Technology, Department of Atomic Energy, Indore, India; Proceedings of the 2013 IEEE Second Conference on Image Information Processing (ICIIP-2013) (Year: 2013).*

Kain, Erik, "Microsoft is Developing 3D Projection Technology That Could Turn Your Room Into a Game", Sep. 11, 2012, Forbes. com (Year: 2012).

* cited by examiner

VIRTUAL DISPLAY DEVICE FOR AN INTERACTIVE MERCHANT SALES ENVIRONMENT

CROSS REFERENCE TO RELATED APPLICATION

This application is a continuation of U.S. application Ser. No. 14/513,178, filed Oct. 13, 2014, which is hereby incorporated by reference in its entirety.

TECHNICAL FIELD

Exemplary embodiments of the present application relate generally to a virtual display device for an interactive merchant sales environment and more specifically to utilizing a projection module of a communication device to virtually display a merchant's store environment and/or items available in the merchant's store environment remotely within a user's present environment, such as a home, office, of vehicle interior.

BACKGROUND

Consumers of merchants may wish to purchase items from the merchant while shopping online or over a remote connection with the merchant. For example, a merchant may be located a substantial distance from a consumer where the consumer does not wish to physically travel to the merchant's location in order to shop with the merchant. However, without inspecting an item, such as the item's dimensions, colors, and/or placement, the consumer may feel uncomfortable making a purchase with the merchant because the consumer does not have sufficient knowledge of how the item may look inside an environment the consumer wishes to place the item. Other times, the consumer may visit the merchant location and wish to purchase items, but not know how the item would look or fit where the consumer wishes to place the item after purchasing it from the merchant. Thus, consumers may make multiple trips to the merchant for measuring the item and/or photographing the item and comparing the item to the environment the user wishes to place the item. Merchants may also miss out on potential sales to consumers who feel they do not have sufficient information to purchase an item without viewing the item in the physical location the consumer plans to place the item.

Figure 1:
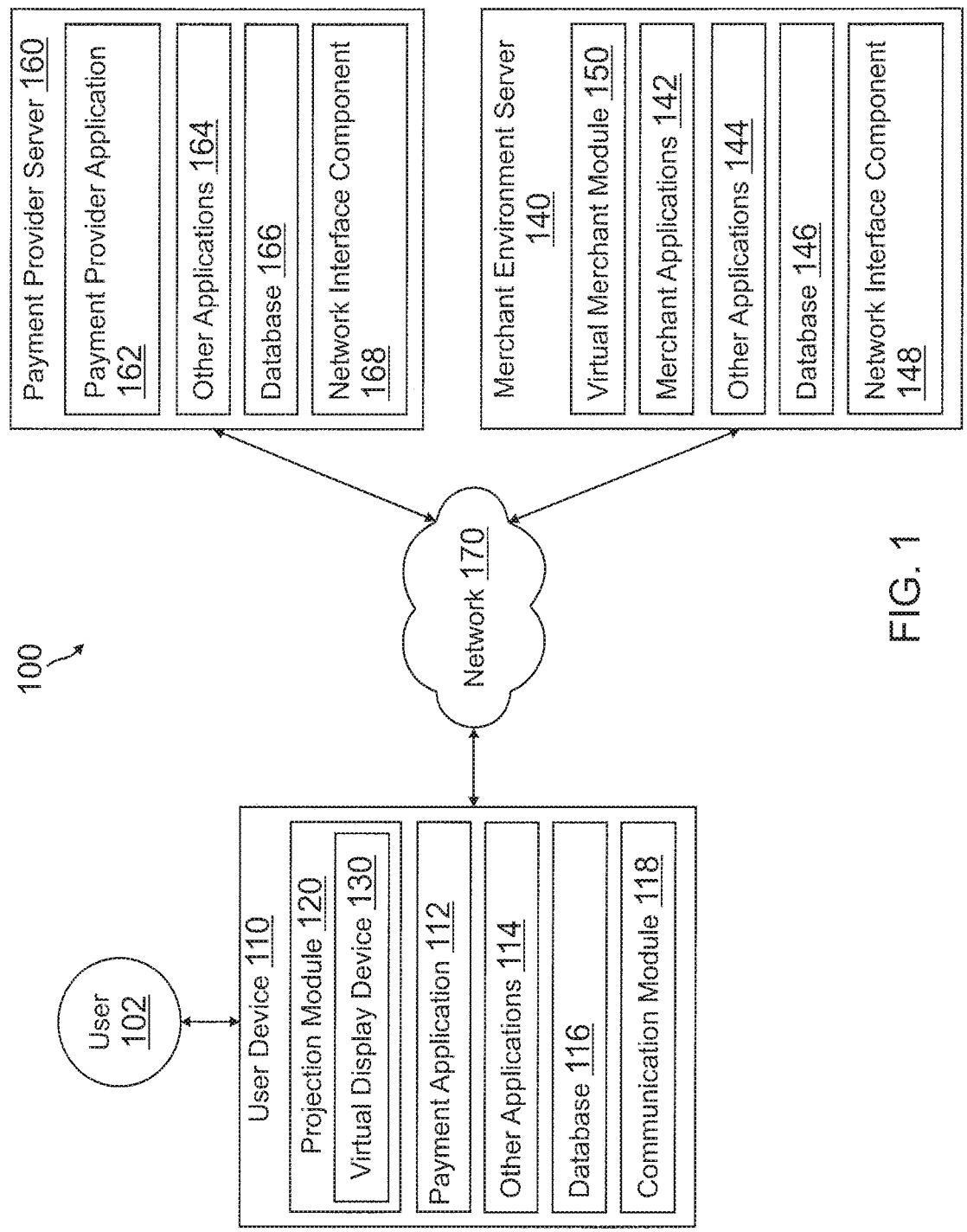
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for a virtual display device for an interactive merchant sales environment. Systems suitable for practicing methods of the present disclosure are also provided.

In various embodiments, a user may utilize a user device, such as a communication device, in order to display an interactive merchant sales environment remotely from the merchant location, for example, within a user environment where the user is located. The communication device may include specialized hardware and/or software allowing the user to receive and display virtual images of the interactive merchant sales environment, such as objects for, within, or available at a merchant environment. A non-transitory memory of a communication device may store the virtual images of the object received from a communication module of the communication device. For example, a user may utilize an input device of the communication device to submit a request to view an object from a merchant environment in the user's current environment. The user may do so after viewing the object from the merchant environment on an output display device of the communication device, such as a display screen. The user may utilize the communication device to access an application or website corresponding to the merchant and view objects from the merchant environment. The objects may correspond to items available from the merchant (e.g., items the merchant is selling, such as furniture, artwork, paint, electronics, upholstery, car interior elements, etc.). The objects may also correspond to the merchant environment itself, such as walls, doors, rooms, layouts, and other objects that are contained within the merchant environment. Thus, the objects may constitute the actual merchant environment in certain embodiments. Once the user has selected to view one or more objects in the user's environment, the request may be sent to a service provider (e.g., the merchant and/or a service provider offering virtual merchant experience services to the merchant).

After transmitting the request, the service provider may communicate one or more virtual images of the object to the communication device. The virtual images may include images that may be projectable in a user environment so that the user may be able to view the object in the user environment. For example, the virtual images may include a three dimensional image of the object. The communication module of the communication device may receive the virtual images and store them to the non-transitory memory. The communication module may also receive parameters for the object, such as a size of the object, a color of the object, and/or spatial configurations of the object. The parameters may be utilized in order to accurately display the virtual images of the object according to an actual size and visual appearance of the object.

A virtual projection module of the user device may be executed by one or more hardware processors in order to utilize a virtual display device of the communication device to project the virtual images for display in the user environment. The virtual projection module may access the virtual images from the non-transitory memory and cause the virtual display device to display the images to the user in the user environment. As previously discussed, the virtual projection module may further utilize the parameters of the object in order to properly scale the virtual images displayed in the user environment so that the virtual images of the object display the object in the correct dimensions and visual appearance of the object. The virtual display device or another input device of the communication device may receive parameters for the user environment, such as size, spatial relations between objects in the user environment, light intensity, or other physical factors of the user environment. The virtual projection module may further utilize the parameters of the user environment with the virtual images and/or the object's parameters in order to properly display the virtual images of the object in the user environment.

The user may utilize an input device of the communication device to move the virtual images of the object within the user environment, for example, moving a vase to another table or placing a painting on a different wall. The object may also correspond to interior aspects of the user environment, such as car/home upholstery, painting, trim, etc. Thus, the user may also use the input device to select different color and/or material schemes. In certain embodiments, the communication device may receive a plurality of an object's virtual images, such as an interior of a mall or merchant storefront. Thus, the communication device may display an entire interior of a remote location to the user in the user environment. In such embodiments, walkthrough information may be received for the remote location, such as a prerecorded or live navigator that presents different aspects of the remote location to the user (e.g., items for sale in a merchant storefront and/or merchants available in the mall). In such embodiments, the user may utilize the input device to select presented features, such as a specific merchant store or an item available in the merchant storefront.

Where a presented object corresponds to an item available for sale from a merchant, the user may choose to purchase the item presented through the communication device. Thus, the user may submit a purchase request for the item using the input device of the communication device. The merchant and/or service provider may receive the purchase request and process the purchase request to complete a sale of the item to the user. The merchant and/or service provider may offer shipping of the item to the user or may offer courier services that may deliver the item directly to the user, for example, from the merchant storefront or a warehouse holding the item.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a merchant environment server 140, and a payment provider server 160 in communication over a network 170. User 102, such as a consumer, utilizes user device 110 to request to view an object from a merchant environment in a user environment where user 102. User device 110 communicates the request to merchant environment server 140 and receives virtual images for the object from merchant environment server 140. User device 110 uses at least one module with associated hardware and software to display the virtual images of the object to user 102 in the user environment. User 102 may then choose to purchase an item corresponding to the object using user device 110. The purchase may be completed using merchant environment server 140 and/or payment provider server 160.

User device 110, merchant environment server 140, and payment provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented as a communication device that may utilize appropriate hardware and software configured for wired and/or wireless communication with merchant environment server 140, and/or payment provider server 160. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a projection module 120 having a virtual display device 130, a payment application 112, other applications 114, a database 116, and a communication module 118. Projection module 120, payment application 112, and other applications 114 may correspond to executable processes, procedures, and/or applications with associated hardware. In other embodiments, user device 110 may include additional or different hardware and software as required.

Projection module 120 may correspond to one or more processes to execute modules and associated devices of user device 110 in order to present one or more virtual images of objects from a merchant to a user while the user is remote from the merchant environment corresponding to such objects, for example, located in a user environment such as a home, office, and/or vehicle. In this regard, projection module 120 may be utilized to, for example, provide a convenient interface to permit a user to browse information available over network 170 and utilize services available from service providers, such as merchant environment server 140, payment provider server 160 and/or merchant devices/servers. In certain embodiments, projection module 120 may be implemented as a web browser configured to view information available over the Internet or access a website of a service provider, including merchant environment server 140, and/or payment provider server 160. For example, projection module 120 may be utilized to access websites and engage in online transactions with a merchant device/server and/or merchant environment server 140.

Additionally, projection module 120 may access other service provider websites, such as payment provider server 160, to facilitate online payments, financial websites to view financial information and engage in financial transactions, messaging websites, social networking websites, and/or other online sources. In various embodiments, one or more of the described modules, features, and/or processes may be implemented in a separate dedicated application or component distinct to the merchant, merchant environment server 140, and/or payment provider server 160. Consequently, projection module 120 may correspond to a plurality of applications and/or modules, each executing on their respective required hardware components.

Projection module 120 may be utilized by user device 110 when user 102 wishes to view one or more objects from a merchant within the user's current environment. Thus, user 102 may utilize an input device of user device 110 with projection module 120 to select one or more objects for viewing when projection module 120 accesses a source for displaying objects from the merchant, such as merchant environment server 140. The request to display objects from the merchant entered by user 102 using the input device may correspond to a request to view items available for purchase from the merchant (e.g., items in a merchant storefront that user 102 may purchase using user device 110). In other embodiments, the objects may correspond to a layout available from the merchant, such as interior upholstery, paint, furniture, etc. Furthermore, the objects may correspond to an overall merchant environment or location for at least one merchant, such as a merchant storefront, retail shopping mall, or other location. User 102 may choose what objects to view using projection module 120, as previously discussed, and submit the request to merchant environment server 140.

Projection module 120 may receive at least one image corresponding to selected objects for viewing by user 102 in a user environment. The images may be received from a service provider, such as merchant environment server 140, using communication module 118 of user device 110. Communication module 118 or projection module 120 may store the images to database 116 in a non-transitory memory of user device 110. Projection module 120 may also access and display the images to user 102 using virtual display device 130. Virtual display device 130 may correspond to an output display device of user device 110 that may project the virtual images of the requested object(s) to user 102 in a user environment. In this regard, virtual display device 130 may include hardware and software for image projection in the user environment. Virtual display device 130 may display still images and/or video images, including streaming video feeds or downloaded video files. Virtual display device 130 may project for display two dimensional images of an object and/or three dimensional images of the object. Thus, virtual display device 130 may include a CRT, LCD, LED, laser diode, or other type of projector light source as a visual output device. Virtual display device 130 may also include audio output device necessary to display audio corresponding to virtual images for display to user 102. Further, virtual display device 130 may include at least one input camera or video recorder that may detect measurements, parameters, light intensity, and other information about the user environment surrounding user device 110.

Thus, projection module 120 may cause virtual display device 130 to display the virtual images of the object(s) by projecting the virtual image into the user environment for user 102. The virtual images received from merchant environment server 140 using communication module 118 may also include parameter information for the object and/or the virtual images, such as size of the object/virtual images, color characteristics of the object/virtual images (e.g., color brightness, saturation, etc.), and/or other measurements, spatial characteristics, and parameters for the object/virtual images. Projection module 120 may use such information to display the virtual images with the correct dimensions of the object/virtual images parameters. As previously discussed, virtual display device 130 may include input device for determining size, lighting, spatial relationships, and/or other parameters of the user environment where user device 110 is located. Projection module 120 may determine parameters for the user environment and store the parameters to database 116 in a non-transitory memory of user device 110. Further, projection module 120 may utilize the parameters of the user environment with the virtual images and/or the parameters of the object/virtual images in order to properly display the virtual images of the object according to the size, color, brightness, or other characteristic of the object.

User 102 may utilize an input device of user device 110 to request to move the virtual images of the object within the user environment, such as through a keyboard, mouse, touchscreen interface, and/or virtual display device 130. Projection module 120 may cause the virtual images to move in the user environment after receiving such input. Projection module 120 may therefore rescale, adjust, or otherwise alter the virtual images using the parameters of the user environment and/or the parameters of the object/virtual images when moving the virtual images. In certain embodiments, the virtual images may correspond to a layout for display in the user environment, such as a car, home, and/or office interior, upholstery, furniture, electronics, accents, or other layout. User 102 may switch between different layout types, materials, colors, or other option using the input device. Thus, projection module 120 may switch between color schemes, material visual effects, etc., when requested. The options may be received in the virtual images or projection module 120 may request virtual images for the various layout options from merchant environment server 140.

As previously discussed, the virtual images may also correspond to a plurality of objects of a merchant environment, such as a merchant storefront and/or a retail shopping mall center. The virtual images may be received with instructions for use, tour, and/or walkthrough of the merchant environment displayed through the virtual images. The instructions may be prerecorded or may include live instructions. The instructions may further include virtual images of a second user, such as a concierge that performs a walkthrough of the merchant environment. Thus, the instructions may include audio, still images, and/or video images for presentation to user 102 using projection module 120. User 102 may advance through the merchant environment and make selections of items and/or objects in the merchant environment using an input device of user device 110 and/or virtual display device 130.

If user 102 wishes to purchase an item displayed in the virtual images (e.g., an item for sale from the merchant), user 102 may utilize an input device of user device 110 with payment application 112 to submit a purchase request for the item. Payment application 112 may correspond to one or more processes to execute modules of user device 110 in order to provide an interface to display payment options for the item(s) selected by user 102 for purchase. Payment application 112 may be implemented as an application having a user interface enabling the user to enter payment options for storage by user device 110, provide payment options on checkout/payment of a purchase order, and complete a transaction for the purchase order. Thus, payment application 112 may receive payment options from user 102 through an input device of user device 110 and/or from payment provider server 160, such as an account established by user 102 with payment provider server 160. Payment application 112 may include further payment processes once user 102 has selected a payment instrument. For example, payment application 112 may provide a convenient interface to permit user 102 to select payment options and provide payment for items, such as the selected item(s). In this respect, payment application 112 may execute a payment module with modules of projection module 120 in order to provide payment for items displayed by projection module 120 through virtual images of such items. Such payment module may provide a payment instrument for use with the item(s) selected from displayed virtual images by projection module 120. The payment module may enable selection of a payment instrument, transmission of the payment instrument with the selected item(s), and receipt of a transaction history. In some embodiments, payment application 112 may correspond more generally to a web browser configured to view information available over the Internet or access a website corresponding to a payment application.

As discussed in reference to event application 102 and payment application 112, modules of such applications may include various software processes and corresponding hardware devices for execution of the described processes. Thus, an aforementioned module may include necessary software and specialized hardware components in order to provide projection of virtual images of an object in a user environment and sale of items displayed through the virtual images. In various embodiments, described modules of projection module 120 and payment application 112 may be incorporated in the same module so as to provide their respective features in one convenient device interface.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with payment provider server 160. Other applications may include mapping application, for example, through a GPS module that may identify user 102 at a location. Other applications 114 may include device interfaces and other display modules that may receive input from user 102 and/or output information to user 102. For example, other applications 114 may contain software programs, executable by a processor, including a graphical user interface (GUI) configured to provide an interface to the user.

User device 110 may further include database 116 stored to a transitory and/or non-transitory memory of user device 110, which may store various applications and be utilized in such applications execution of various modules of user device 110. Thus, database 116 may include, for example, identifiers such as operating system registry entries, cookies associated with projection module 120, payment application 112, and/or other applications 114, identifiers associated with hardware of user device 110, or other appropriate identifiers, such as identifiers used for payment/user/device authentication or identification. In certain embodiments, identifiers in database 116 may be used by an account provider, such as merchant environment server 140 and/or payment provider server 160, to associate user device 110 with a particular account maintained by the account provider. Database 116 may include a request to display objects from a merchant that may be input by user 102 as well as purchase requests for one or more items. Furthermore, database 116 may further include received information, such as virtual images, instructions, object/virtual image parameters, and/or transaction histories.

In various embodiments, user device 110 includes at least one communication module 118 adapted to communicate with merchant environment server 140 and/or payment provider server 160 over network 170. In various embodiments, communication module 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant environment server 140 may correspond to a server utilized by a service provider for receiving request to view objects for a merchant within a user environment for user 102. In this regard, merchant environment server 140 includes one or more processing applications which may be configured to interact with user device 110 and/or payment provider server 160 to facilitate the provision of virtual images corresponding to the objects to user device 110 for display to user 102. In one example, merchant environment server 140 may be provided by EBAY®, Inc. of San Jose, Calif., USA. However, in other embodiments, merchant environment server 140 may be maintained by a merchant directly or by another service provider offering interactive virtual images of objects corresponding to a merchant in a user environment. Although merchant environment server 140 is shown as separate from payment provider server 160, it is understood the services provided by merchant environment server 140 may be incorporated within payment provider server 160 and vice versa (e.g., transaction processing using a payment instrument). Although a merchant environment server is shown, the merchant environment server may be managed or controlled by any suitable processing device. Although only one merchant environment server is shown, a plurality of merchant environment server may function similarly.

Merchant environment server 140 of FIG. 1 contains a virtual merchant module 150, merchant applications 142, other applications 144, a database 146, and a network interface component 148. Virtual merchant module 150, merchant applications 142, and other applications 144 may correspond to executable processes, procedures, and/or applications with associated hardware. In other embodiments, merchant environment server 140 may include additional or different hardware and software as required.

Virtual merchant module 150 may correspond to one or more processes to execute modules and associated devices of merchant environment server 140 in order to receive a request to view at least one object from a merchant and provide one or more virtual images of the objects from the merchant to user device 110 for display to user 102 while user 102 is remote from the merchant environment. Virtual merchant module 140 may be utilized by merchant environment server 140 when user 102 wishes to view one or more objects from a merchant within the user's current environment. Thus, virtual merchant module 150 may execute a module corresponding to specialized hardware and/or software that may access virtual images corresponding to the requested object(s) for viewing stored to database 146 in a non-transitory memory of merchant environment server 140. The virtual images may be recorded by an administrator of virtual environment server 140, various input devices of merchant environment server 140, and/or a merchant using an input device, such as a camera, video recorder, and/or audio recorder. Once the virtual images are input to merchant environment server 140 and stored to database 146, virtual merchant module 150 may access the virtual images when requested by user device 110.

Virtual merchant module 150 may provide virtual images to user device 110 with associated parameters for use when presenting the virtual images to user 102. Virtual merchant module 150 may also provide instructions when displaying the virtual images to user 102, such as a walkthrough, sales presentation, or purchase instructions. Moreover, virtual merchant module 150 may provide further virtual images associated with the requested virtual image, such as advancements in a walkthrough of a merchant environment, related objects to the requested object (e.g., related items to a requested item, such as similar artwork, similar electronics, similar furniture, and/or other similar items the merchant offers for sale), and/or varying characteristics of an item or layout the merchant offers for sale (e.g., different materials, colors, etc., of the item/layout). The additional virtual images may be provided to user device 110 to provide more seamless transitions between changing characteristics. Moreover, virtual merchant module 150 may also receive purchase requests for items and utilize merchant applications 142 to process the purchase requests or transmit the purchase requests to a merchant where the merchant's purchase processing is performed remote from merchant environment server 140.

Thus, merchant applications 142 may correspond to one or more processes to execute modules of user device 110 in order to provide item sales of items available from a merchant where merchant environment server 140 provides such purchase and sales processing. Thus, merchant applications 142 may execute a sales module that may enable merchant environment server 140 to process a received purchase request from user device 110. Merchant applications 142 may facilitate the exchange of money for items using user device 110 and/or payment provider server 160. More generally, merchant applications 142 may provide services to user 102 over network 170, including information services for the items available at from the merchant, inventory of available items, cost of available items, and/or shipping/delivery information for the available items. In this regard, merchant applications 142 may further utilize a communication module/component of merchant environment server 140 (e.g., network interface component 148) to provide available merchant items (e.g., goods, products, and/or services) for the merchant corresponding to merchant environment server 140 to user device 110.

Merchant applications 142 may facilitate the sale of items from the merchant, including payment to the merchant from user 102. Merchant applications 142 may execute the module to process payments from users, including user 102 for selected items, using payment provider server 160. The module may utilize network interface component 148 to communicate with user device 110 and/or payment provider server 160 to receive a payment instrument for a purchase request of the selected items and process a payment for the selected items in the purchase order using the payment instrument. Merchant applications 142 may also cause the module to generate and transmit a transaction history to user 102 documenting the sale transaction for the selected items. Additionally, merchant applications 142 may provide information for user 102 for shipping and/or pickup of the items. Merchant applications 142 may also provide courier services that may directly deliver items to user 102 at a specified location, for example, from a merchant storefront location and/or warehouse location.

In various embodiments, user device 110 includes other applications 144 as may be desired in particular embodiments to provide features to user device 110. For example, other applications 144 may include security applications for implementing client-side security features, programmatic client applications for interfacing with appropriate application programming interfaces (APIs) over network 170, or other types of applications. Other applications may include mapping application that may assist delivery and/or courier services in providing purchased items to user 102. Other applications 144 may contain software programs, executable by a processor, including a graphical user interface (GUI) configured to provide an interface to the user.

Merchant environment server 140 includes database 146 stored to a transitory and/or non-transitory memory of merchant environment server 140, which may store various applications and be utilized in such applications executing of various modules of merchant environment server 140. In this regard, database 146 may include merchant menus, merchant information, and/or merchant locations. Database 146 may include a received preorder for user 102, preorder information, such as delivery information, and payment information for user 102. Information in database 146 may be utilized by one or more of user device 110 and/or payment provider server 160 to complete preorders for user 102.

In various embodiments, merchant environment server 140 includes at least one network interface component 146 adapted to communicate with network 170 including user device 110 and/or payment provider server 160. In various embodiments, network interface component 146 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment provider server 160 may be maintained, for example, by an online payment service provider, which may provide payment services and/or processing for financial transactions on behalf of user 102. In this regard, payment provider server 160 includes one or more processing applications which may be configured to interact with user device 110 and/or merchant environment server 140 to facilitate payment for a transaction (e.g., a purchase request for one or more selected items available from a merchant). In one example, payment provider server 160 may be provided by PAYPAL®, Inc. of San Jose, Calif., USA. However, in other embodiments, payment provider server 160 may be maintained by or include a credit provider, financial services provider, financial data provider, and/or other service provider, which may provide payment services to user 102. Although payment provider server 160 is shown as separate from merchant environment server 140, it is understood the services provided by payment provider server 160 may be incorporated within merchant environment server 140 (e.g., transaction processing using a payment instrument).

Payment provider server 160 of FIG. 1 includes a payment provider application 162, other applications 164, database 166, and a network interface component 168. Payment provider application 162 may correspond to processes, procedures, and/or applications, for example, a software program, executable by a hardware processor. In other embodiments, payment provider server 160 may include additional or different software as required.

Payment provider application 162 may execute one or more modules of payment provider server 160 to receive and/or transmit information from user device 110 and merchant environment server 140 for processing and completion of financial transactions for item available from a merchant corresponding to merchant environment server 140. In this regard, network interface component 168 may receive a request to complete a sale transaction for items/services/goods included in a purchase request for user 102 with the merchant corresponding to merchant environment server 140. The request may correspond to a payment from user device 110 to merchant environment server 140 and/or the merchant. The payment may include a user account identifier (e.g., a payment account for user 102 with payment provider server 160) or other payment instrument (e.g. a credit/debit card or checking account). Additionally, the payment may include a payment amount and terms of payment. Payment provider application 162 may complete the transaction by providing payment to merchant environment server 140 and/or the merchant. Additionally, payment provider application 162 may utilize network interface component 168 to provide transaction histories, including receipts, to user device 110, merchant environment server 140, and/or the merchant for completion and documentation of the financial transaction.

Payment provider server 160 includes other applications 164 as may be desired in particular embodiments to provide features to payment provider server 160. For example, other applications 164 may include security applications for implementing server-side security features, programmatic server applications for interfacing with appropriate application programming interfaces (APIs) over network 170, or other types of applications. Other applications 164 may contain software programs, such as a graphical user interface (GUI), executable by a processor that is configured to provide an interface to a user. Other applications 164 may include account applications, including user account services, financial accounting services, and/or financial statement services.

Additionally, payment provider server 160 includes database 166 stored to a transitory and/or non-transitory memory of payment provider server 160, which may store various applications and be utilized in such applications execution of various modules of payment provider server 160. As previously discussed, user 102 may establish one or more user accounts with payment provider server 160. User accounts in database 166 may include user information, such as name, address, birthdate, payment/funding information, additional user financial information, and/or other desired user data. User 102 may link user accounts in database 166 to user device 110 through a user device identifier. Thus, when an identifier corresponding to user 102/user device 110 is transmitted to payment provider server 160 (e.g., from user device 110 and/or merchant environment server 140), a user account belonging to user 102 may be found. More generally, user accounts in database 166 may correspond to an account established by a user and maintained for engaging in online transactions. However, in other embodiments, user 102 may not have previously established a user account. Thus, payment provider server 160 may complete a transaction based on another payment instruments received from user device 110 and/or merchant environment server 140.

In various embodiments, payment provider server 160 includes at least one network interface component 168 adapted to communicate with user device 110 and/or merchant environment server 140 over network 170. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
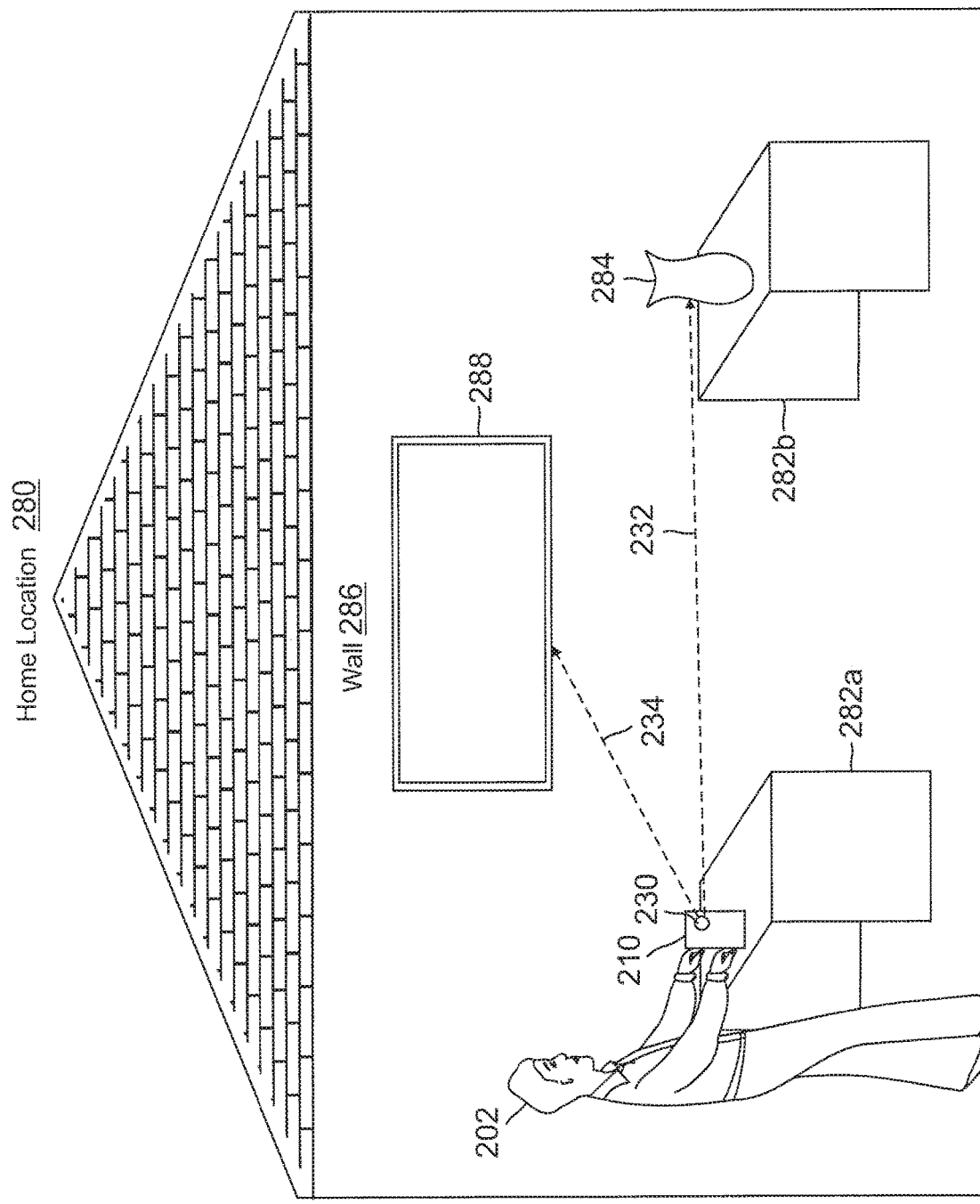
FIG. 2 is an exemplary user environment where a user may view virtual images of one or more objects displayable using a virtual display device, according to an embodiment.

FIG. 2 is an exemplary user environment where a user may view virtual images of one or more objects displayable using a virtual display device, according to an embodiment. In FIG. 2, a user device 210 executes a projection module, corresponding generally to the executable modules and processes described in reference to projection module 120 of FIG. 1, in order to display a virtual images to a user 202 using a virtual display device 230 corresponding generally to virtual display device 130 of FIG. 1.

As previously discussed, a projection module of user device 210 may be executed in order to provide virtual image projection into a user environment, such as at home location 280 of user 202. In this regard, virtual display device 230 projects for display virtual vase 284 and virtual television 288. Home location 280 includes user 202 utilizing user device 210 to request display of one or more objects to be displayed in various location within home location 280. For example, user 202 may request to view a vase available with a merchant on a table 282b in order to determine if the vase fits, matches, or otherwise is desirable to the user to place on table 282b. Similarly, user 202 may also request to view a television available with the same or another merchant on a wall 386 to determine dimensions of the television on wall 286. Thus, user 202 may submit requests to view the vase and the television in home environment 280.

After receiving virtual images for the vase and/or television from a service provider (e.g., two dimensional and/or three dimensional still or video images of the objects), user device 210 may utilize virtual display device 230 to project the virtual images for display on table 282b and wall 286. User 202 may place user device 210 on table 282a so that user device 210 may project the images. As previously discussed, the projection module may utilize the virtual images, parameters of the virtual images, and/or parameters of home environment 280, table 282a, table 282b, and/or wall 286 in order to display the virtual images according to their correct perspective. Thus, user device 210 causes virtual display device 230 to project image 232 for virtual vase 284 on table 282b. Similarly, user device 210 causes virtual display device 230 to project image 234 of virtual television 288 onto wall 286. Image 232 and image 234 may correspond to one or a plurality of virtual images, which may be altered to correct perspectives within home location 280. User 202 may also utilize user device 210 to move virtual vase 284 and/or virtual television 288 within home location 280, for example, by placing virtual vase 284 closer to user 202 on table 282a. When doing so, user device 210 may resize and adjust image 232 so that virtual vase 284 is displayed according to proper perspectives and sizes of the vase that virtual vase 284 is displaying.

Figure 3:
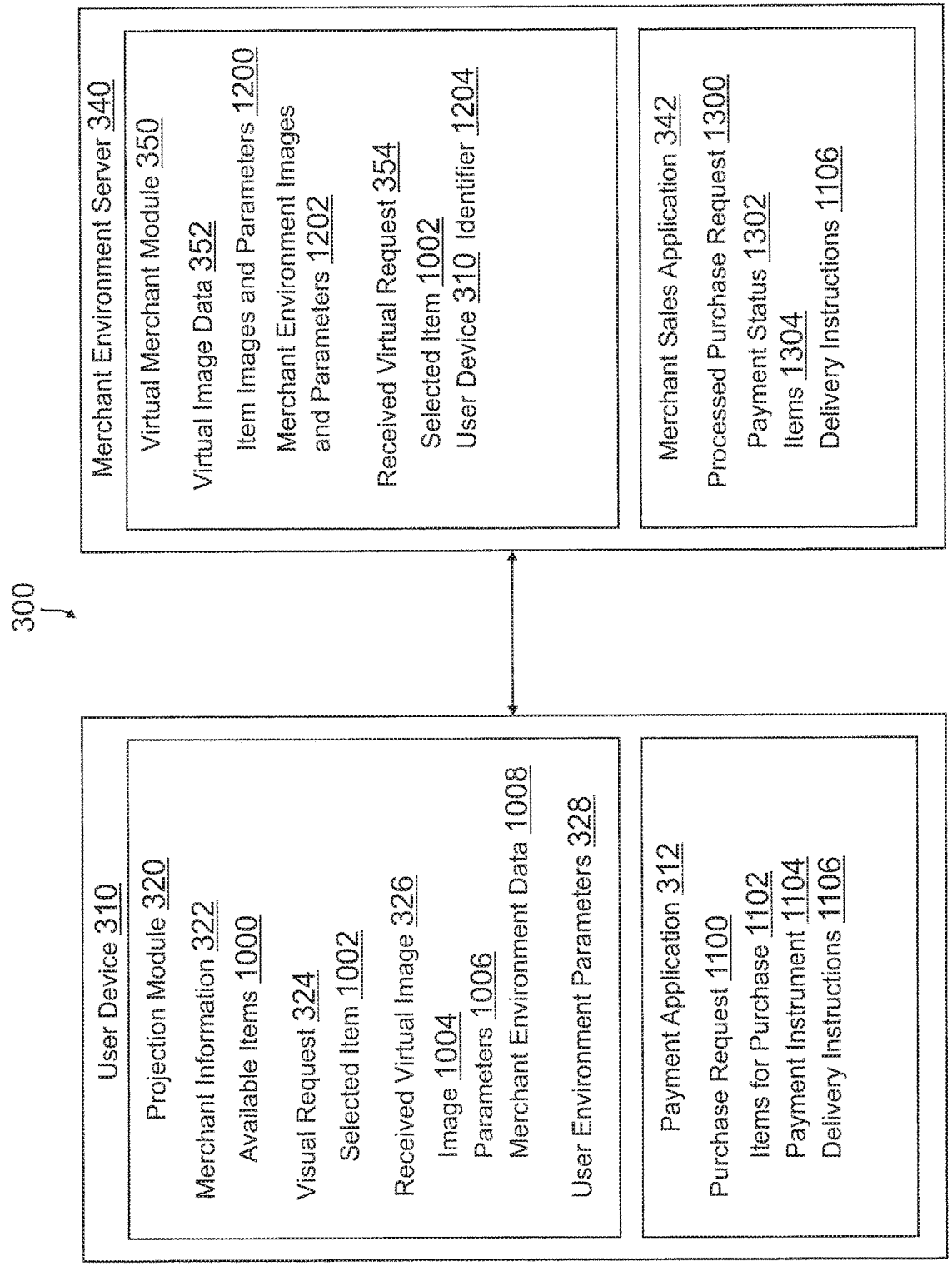
FIG. 3 is an exemplary environment having a virtual display device receiving virtual images for display in a user environment, according to an embodiment.

FIG. 3 is an exemplary environment having a virtual display device receiving virtual images for display in a user environment, according to an embodiment. Environment 300 includes a user device 310 and a merchant environment server 340 corresponding generally to user device 110 and merchant environment server 140, respectively, of FIG. 1. User device 310 executes a projection module 320 and a payment application 312 corresponding generally to the executable modules and processes described in reference to projection module 120 and payment application 112, respectively, of FIG. 1. Moreover, merchant environment server 340 executes a virtual merchant module 350 and a merchant sales application 342 corresponding generally to the executable modules and processes described in reference to virtual merchant module 150 and merchant application 142, respectively, of FIG. 1.

As previously discussed, projection module 320 may correspond to specialized hardware and processes used to display virtual objects from a merchant in a user environment. In this respect, projection module 320 may communicate with one or more input and/or output devices through an input/output (i/o) interface in order to display merchant information 322 to a user of user device 310 and receive a visual request 324. Merchant information 322 displayed to the user through an output display device (e.g., a display screen) may include available items 1000 from a merchant corresponding to merchant information 322. The user may make selections of available items 1000 in order to view the items in the user environment. Thus, the user may generate a visual request 324 having selected item 1002, an item the user wishes to view in the user environment.

Visual request 324 may be transmitted to merchant environment server 340. Virtual merchant module 350 may receive, access, and/or process visual request 324 with virtual image data 352. Virtual image data 352 may include data stored to a database in a transitory and/or non-transitory memory of merchant environment server 340, and may include item images and parameters 1200 and merchant environment images and parameters 1202. Item images and parameters 1200 may include item virtual images for objects for sale from a merchant, such as items for sale from the merchant. Item images and parameters 1200 also includes the item/virtual images parameters, such as size, scaling information, color information (e.g., brightness saturation, etc.), light intensity, weight, and/or other item parameter information. Similarly, merchant environment virtual images and parameters 1202 may include virtual images and parameters (e.g., spatial relationships, sizes, measurements, light intensity, etc.) for objects corresponding to a merchant and/or merchant environment, such as the merchant's storefront, a retail shopping mall, etc. By determining the object request to view in received virtual request 354 (e.g., selected item 1002), virtual merchant module 350 may access virtual images for selected item 1002 from virtual image data 352. Received virtual request 354 further includes user device 310 identifier 1204 used to communicate the virtual images back to user device 310.

User device 310 may utilize a communication module to receive virtual images for selected item 1002. Received virtual image 326 may correspond to one or more virtual images for selected item 1002 and displayable to the user of user device 310. Thus, received virtual image 326 includes image 1004, which may include the one or more virtual images. Received virtual image 326 further includes parameters 1006 corresponding to the parameters of the selected item 1002 and/or image 1004 (e.g., size, scaling information, color information, light intensity information, etc.) used to display image 1004 to the user. Received virtual image 326 further includes merchant environment data 1008 where applicable that may include information of a merchant environment corresponding to selected item 1002 that may be displayed with selected item 1002 for a more immersive merchant shopping experience. Projection module 320 may further receive and/or access user environment parameters 328 that may include size, spatial relations of objects in a user environment, lighting, or other environment information for the current environment of the user and/or user device 310. User environment parameters 328 may be utilize to properly display image 1004 to the user.

If the user of user device 310 chooses to purchase selected item 1002 and/or other items, the user may cause user device 310 to execute payment application 312 to purchase items. Payment application 312 includes a purchase request for one or more items the user wishes to purchase. Thus, payment application 312 includes items for purchase 1102, payment instrument 1104, and delivery instructions 1106. Items for purchase 1102 include the one or more items the user wishes to purchase. Payment instrument 1104 designates a payment instrument to use in payment for items for purchase 1102 (e.g., a payment account, a credit card, a bank account, etc.) and delivery instructions 1106 contains instructions for delivery of items for purchase 1102 (e.g., courier service, shipping address, etc.). Purchase request 1100 may be transmitted to merchant environment server 340 and processed using merchant sales application 342 (including use of a payment service provider in various embodiments). Thus, merchant sales application 342 includes a processed purchase request 1300 having a payment status 1302, items 1304, and delivery instructions 1106.

Figure 4:
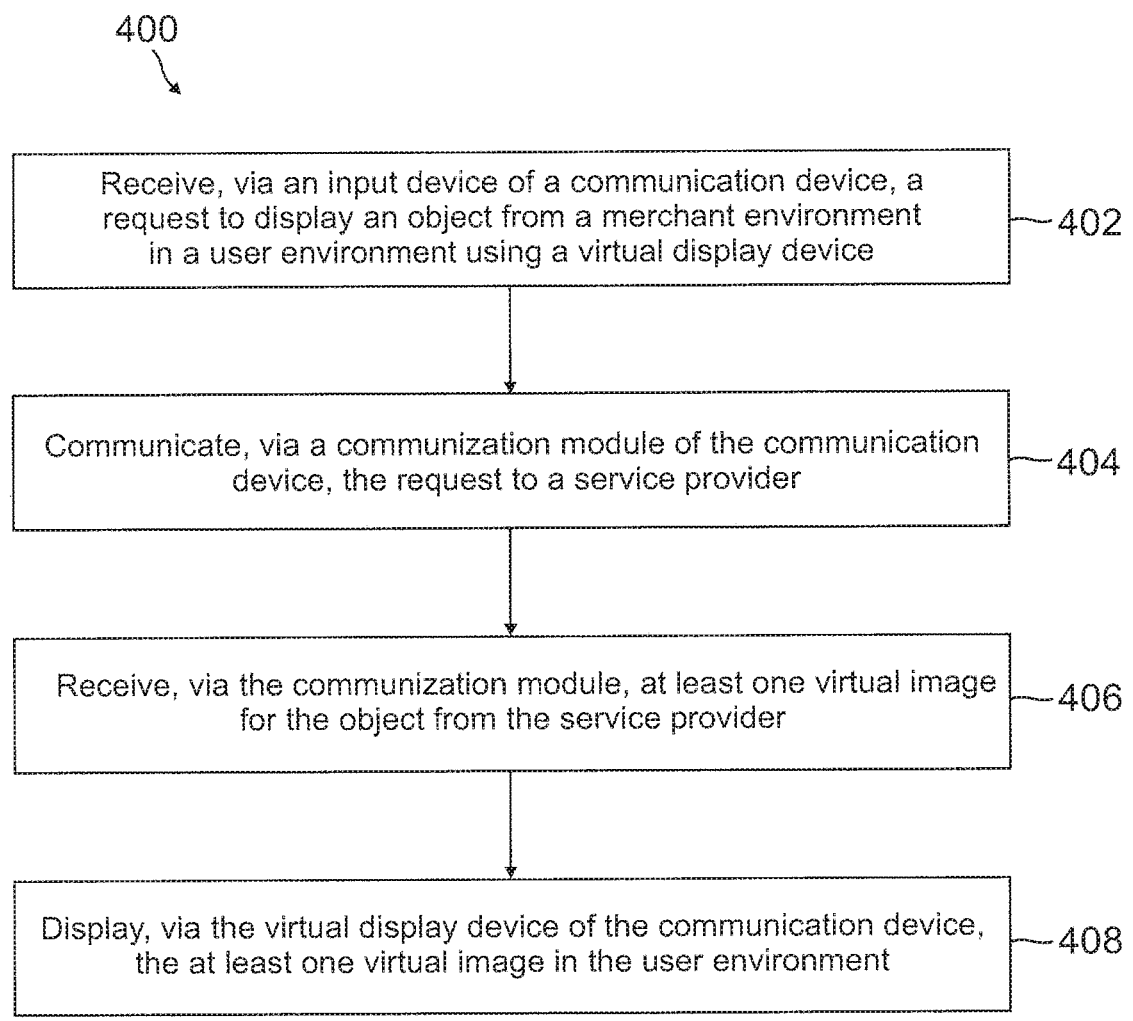
FIG. 4 is a flowchart of an exemplary process for user by a virtual display device for an interactive merchant sales environment, according to an embodiment.

FIG. 4 is a flowchart of an exemplary process for use by a virtual display device for an interactive merchant sales environment, according to an embodiment. Note that one or more steps, processes, and methods described herein may be omitted, performed in a different sequence, or combined as desired or appropriate.

At step 402, a request to display an object from a merchant environment in a user environment using a virtual display device is received, via an input device of a communication device. The object may also correspond to a layout available from a merchant and/or an item for sale from the merchant, for example, available in the merchant environment. For example, a layout may comprise at least one interior aspect of the user environment, and wherein the user environment comprises one of a car, a residential room, and a business office. An interior aspect may comprise at least one of upholstery, window tint, window coverings, interior trim, interior paint, artwork, furniture, and an electronic appliance.

The request is communicated to a service provider, via a communication module of the communication device, at step 404. The service provider may comprise one of the merchant, a payment provider, and a third party providing the at least one virtual images for the merchant. At step 406, at least one virtual image for the object is received from the service provider, via the communication module. The at least one virtual image may comprise an image for projection into the user environment to display a virtual copy of the object/layout/item. Thus, the at least one virtual image may comprise a two dimensional and/or three dimensional still/video image of the object/layout/item.

At step 408, the at least one virtual image is displayed in the user environment, via the virtual display device of the communication device. In various embodiments, a visual input device may determine user environment parameters for the user environment. The at least one virtual image may be displayed in the user environment using the user environment parameters so as to properly display the at least one virtual image. The communication device may also receive display dimensions for the at least one virtual image that may further be utilized to properly display the at least one virtual image. The at least one virtual image may also include merchant environment images, which may include merchant environment image parameters. Such merchant environment images may be displayed with virtual images of the object using the merchant environment image parameters.

The communication device may receive walkthrough information for the merchant environment images and output the walkthrough information to the user through an output device, such as a display, speaker, or other audio/video output device. The walkthrough information may comprise at least one of an automated walkthrough, a live walkthrough from a second user, visual indicators, and voice indicators. The user may utilize an input device to transition between merchant environment images and/or select a new object in the merchant environment images. If the user selects a new object, the communication device may receive and/or display virtual image(s) for the new object to the user in the user environment. The user may also utilize the input device to move the virtual image(s) of the objects to new locations in the user environment, where the virtual images may be adjusted for display in the new locations. The user may also receive instructions of where to place the communication device in the user environment in order to view the virtual images. The user may also enter a purchase request for an item displayed using the communication device, which may be transmitted to a payment provider and/or merchant server for processing. The merchant may utilize a courier service to provide direct delivery of the item to the user.

Figure 5:
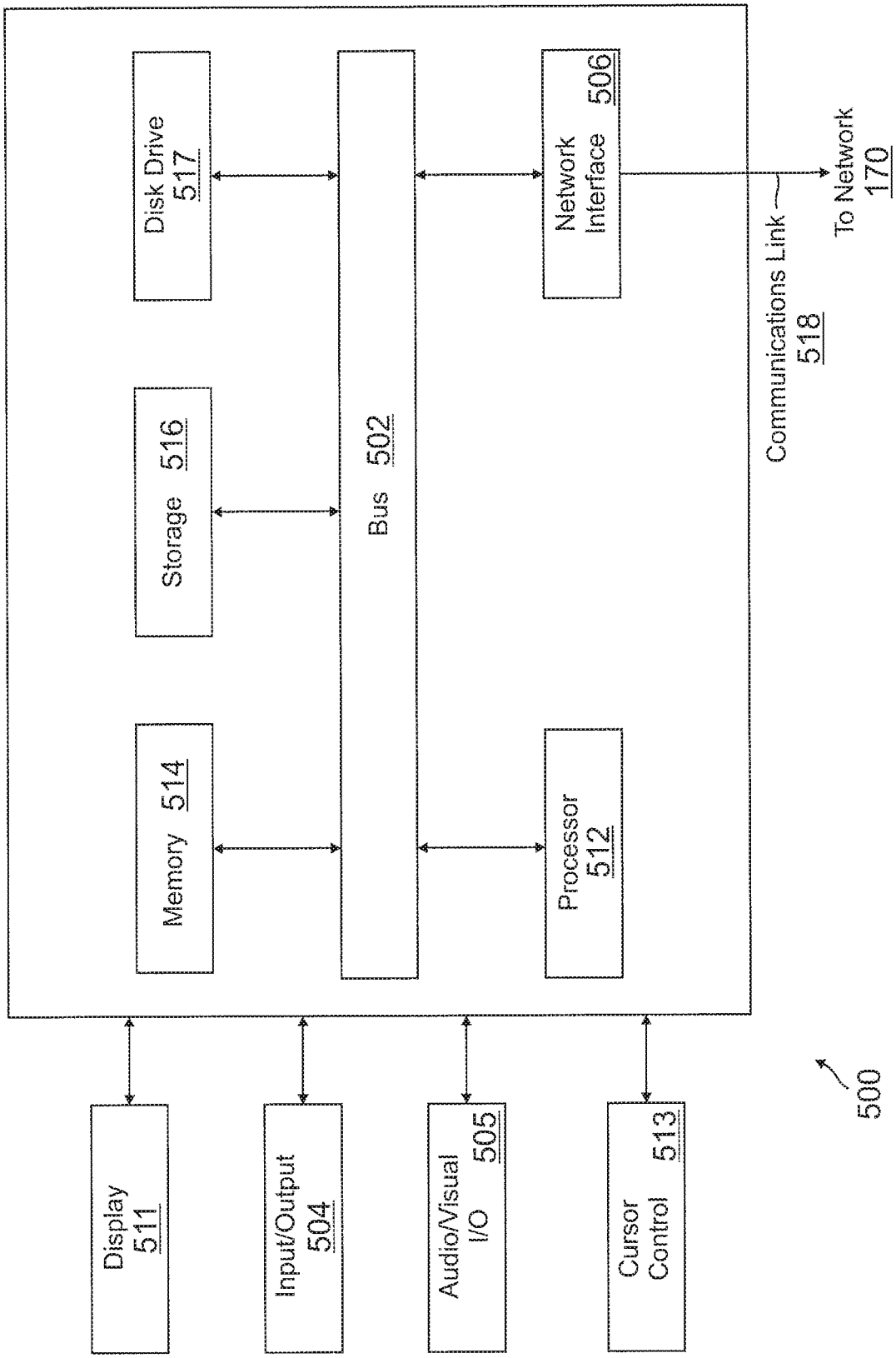
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a virtual display component;
    a non-transitory memory storing instructions; and
    one or more hardware processor coupled to the non-transitory memory and configured to read the instructions from the non-transitory memory to cause the system to perform operations comprising:
        accessing or receiving data associated with a plurality of physical merchants, wherein the data comprises virtual representations of the plurality of physical merchants and virtual images of items available from the plurality of physical merchants;
        determining environmental parameters for a user environment of a first user associated with the virtual display component, wherein the user environment comprises a real-world physical environment of the virtual display component;
        determining display requirements for a three-dimensional (3D) display of at least a portion of the data in the user environment based on the environmental parameters;
        generating a first 3D image of a first one of the plurality of physical merchants based on the display requirements and the at least a portion of the data;
        displaying, using the virtual display component, the first 3D image within the user environment, wherein the displaying comprises projecting the first 3D image onto a surface within the real-world physical environment;
        automatically simulating a walkthrough of the first 3D image of the first one of the plurality of physical merchants;
        receiving a user selection of an item displayed in the first 3D image during the simulated walkthrough; and
        in response to receiving the user selection of the item displayed in the first 3D image during the simulated walkthrough, moving the item displayed in the first 3D image in the simulated walkthrough to be displayed in the user environment separate from the first 3D image in the simulated walkthrough.

2. The system of claim 1, wherein the operations further comprise:
    receiving a user request from the first user to transition to a second one of the plurality of physical merchants;
    generating a second 3D image of the second one of the plurality of physical merchants based on the display requirements; and
    displaying, using the virtual display component, the second 3D image within the user environment in place of the first 3D image.

3. The system of claim 1, wherein the plurality of physical merchants are associated with a retail merchant environment, wherein the virtual representations are further of the retail merchant environment, and wherein prior to displaying the first 3D image, the operations further comprise:
    generating a second 3D image of the retail merchant environment; and
    transitioning between the second 3D image and the first 3D image within the user environment.

4. The system of claim 3, wherein the data further comprises virtual user images of a second user associated with the retail merchant environment, wherein the virtual user images provide the first user with a guide of the plurality of physical merchants in the retail merchant environment.

5. The system of claim 4, wherein the virtual user images comprise one of a live broadcast of the second user or a prerecorded video of the second user, and wherein the virtual user images further comprise audio content of the second user.

6. The system of claim 3, wherein the operations further comprise:
    providing user controls to the first user with at least one of the first 3D image or the second 3D image, wherein the user controls allow the first user to advance and rewind through the virtual representations of the plurality of physical merchants and the retail merchant environment.

7. The system of claim 1, wherein the operations further comprise:
    generating a second 3D image of the item available from the first one of the plurality of physical merchants based on the display requirements; and
    displaying, using the virtual display component, the second 3D image within the first 3D image.

8. The system of claim 7, wherein the operations further comprise:
    determining a real-world size of the item;
    determining a spatial relationship of the real-world size to the user environment based on the environmental parameters; and
    adjusting a size of the second 3D image within the user environment based on the spatial relationship.

9. The system of claim 8, wherein the operations further comprise:
    providing an item option control with the second 3D image, wherein the item option control allows the first user to change at least one of an item size of the item, a color of the item, a material of the item, or an effect of the item.

10. The system of claim 8, wherein the operations further comprise:
    receiving a purchase request-for the item; and
    processing the purchase request with the first one of the plurality of physical merchants.

11. A method comprising:
receiving a first request for a three-dimensional (3D) display of a physical merchant location having a plurality of merchants within a real-world physical location of a user;
transmitting, to a 3D display device, 3D virtual display data for a virtual environment associated with the physical merchant location, wherein the 3D virtual display data comprise 3D virtual images associated with the plurality of merchants;
causing virtual display options associated with the physical merchant location and the plurality of merchants to be displayed based on the 3D virtual display data;
receiving a first selection of a first merchant of the plurality of merchants from the virtual display options;
causing a first set of the 3D virtual images associated with the first merchant to be displayed in the real-world physical location using the 3D display device, wherein the first set of the 3D virtual images are displayed by projecting the first set of the 3D virtual images onto a surface within the real-world physical location;
automatically simulating a walkthrough of a merchant location of the first merchant via the first set of the 3D virtual images;
receiving a user selection of an item displayed in the first set of the 3D virtual images during the simulated walkthrough; and
in response to receiving the user selection of the item displayed in the first set of the 3D virtual images during the simulated walkthrough, moving the item displayed in the first set of the 3D virtual images to be displayed in the real-world physical location separate from the walkthrough of the merchant location of the first merchant.

12. The method of claim 11, further comprising:
receiving a second selection of a second merchant of the plurality of merchants from the virtual display options; and
causing a second set of the 3D virtual images associated with the second merchant in the real-world physical location to be displayed, wherein the displaying causes a transition from the first set of the 3D virtual images to the second set of the 3D virtual images.

13. The method of claim 11, wherein the walkthrough comprises at least one of audio data output or video data output associated with navigations between each of the first set of the 3D virtual images associated with the first merchant.

14. The method of claim 11, wherein prior to causing the virtual display options to be displayed, the method further comprises:
causing the 3D virtual display data for the virtual environment of the physical merchant location in the real-world physical location to be displayed, wherein the virtual display options are overlaid onto the physical merchant location for navigations between the each of the plurality of merchants.

15. The method of claim 11, wherein the method further comprises:
receiving an input from the user to move the display of the item from a first location in the real-world physical location to a second location in the real-world physical location.

16. The method of claim 15, wherein the method further comprises:
increasing a virtual display size of the item in the moving the item from the first set of the 3D virtual images to the real-world physical location.

17. The method of claim 15, the method further comprises:
decreasing a virtual display size of the item in the moving the item from the walkthrough to be displayed in the real-world physical location.

18. The method of claim 17, wherein the item is displayed based on physical dimensions of the real-world physical location and physical dimensions of the item.

19. A non-transitory machine-readable medium having stored thereon machine-readable instructions executable to cause a machine to perform operations comprising:
displaying a virtual environment comprising a three-dimensional (3D) projection of a plurality of physical merchant locations within a real-world environment associated with a user, wherein the virtual environment is displayed based on physical parameters of the real-world environment, and wherein the plurality of physical merchant locations comprise a plurality of items available for sale within the plurality of physical merchant locations;
receiving a first selection within the virtual environment of a merchant location from the plurality of physical merchant locations;
transitioning the virtual environment to the merchant location within the real-world environment;
automatically simulating a virtual walkthrough of the merchant location;
receiving, during the simulated virtual walkthrough, a selection of an item from the plurality of items, wherein the item is available for sale within the merchant location; and
moving a display of the item from the merchant location in the simulated virtual walkthrough to the real-world environment separate from the simulated virtual walkthrough of the merchant location, wherein the moving causes an adjustment of the display of the item based on the physical parameters of the real-world environment and real-world dimensions of the item.

20. The non-transitory machine-readable medium of claim 19, wherein wherein the item is displayed in the real-world environment based on physical dimensions of the real-world environment and physical dimensions of the item.

* * * * *